(12) United States Patent
Evans

(10) Patent No.: US 6,290,736 B1
(45) Date of Patent: Sep. 18, 2001

(54) CHEMICALLY ACTIVE SLURRY FOR THE POLISHING OF NOBLE METALS AND METHOD FOR SAME

(75) Inventor: David R. Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/247,655

(22) Filed: Feb. 9, 1999

(51) Int. Cl.[7] .............................. C09G 1/02; H01L 21/304

(52) U.S. Cl. .................... 51/307; 51/308; 51/309; 106/3; 252/79.1; 216/89; 438/692; 438/693

(58) Field of Search .................... 106/3; 216/89; 252/79.5, 79.1; 51/307, 308, 309; 438/692, 693

(56) References Cited

U.S. PATENT DOCUMENTS

| 5,084,071 | 1/1992 | Nenadic et al. | 51/309 |
| 5,225,034 | 7/1993 | Yu et al. | 156/636 |
| 5,700,383 | * 12/1997 | Feller et al. | 216/88 |
| 5,780,358 | 7/1998 | Zhou et al. | 438/645 |

* cited by examiner

Primary Examiner—C. Melissa Koslow
(74) Attorney, Agent, or Firm—David C. Ripma; Matthew D. Rabdau; Scott C. Krieger

(57) ABSTRACT

A slurry and CMP process to polish a noble metal surface is provided. The slurry and polishing process are used to form a damascene, or dual damascene noble metal inlay. Such as inlay is useful is forming an integrated circuit ferroelectric capacitor electrode. The slurry includes a halogen, such as bromine, in a basic aqueous solution to chemically react with the noble metal. With an abrasive added, the slurry is used to polish and remove noble metals from a wafer surface during a CMP process.

8 Claims, 4 Drawing Sheets

CHEMICALLY ACTIVE SLURRY FOR THE POLISHING OF NOBLE METALS AND METHOD FOR SAME

BACKGROUND AND SUMMARY OF THE INVENTION

This invention relates generally to integrated circuit (IC) fabrication processes and, more specifically, to a chemical-mechanical polish (CMP) slurry that permits the planarization of noble metals, and the formation of noble metal damascene electrode structures.

CMP processes are designed to polish IC surfaces in a mass production fabrication environment to a flatness in the range of approximately 50 to 1500 Å, across a wafer surface. CMP processes are often performed after metalization steps. A deposited metal film must be planarized in some wafer areas, while the metal is entirely removed in other regions of the wafer. Thus, metal, as well as silicon, silicon oxide, and various other dielectric materials may be removed simultaneously without contaminating or damaging the underlying wafer surface.

In many commercial processes, interconnection metals such as Al or W are deposited as a film on a wafer surface through physical vapor deposition (PVD) or sputtering. Interconnection lines across a wafer surface, or vias to subsequently formed overlying IC metal levels, are formed by pattern etching to remove the undesired areas of the metal film. Oxide is typically used to insulate around the metal interconnections. Upon completion of an IC level, a CMP process is performed to render the surface planar.

Platinum (Pt) and other noble metals are used in IC structure ferroelectric capacitors. The use of noble metals is motivated by their inherent chemical resistance. This property is especially desirable under high temperature oxidation conditions, such as those seen in the fabrication of ferroelectric capacitors. In addition, chemical interaction between noble metals and ferroelectric materials such as perovskite metal oxides, is negligible.

However, the pattern etching of noble metals, whether done through wet or dry processes, can be problematic. Etching tends to lead to poor pattern definition. For example, the resultant metal structure often have sloped, instead of vertical, walls. Etching processes also leave chemical residues, and even a CMP process cannot remove residues from vertical sidewall structures.

Metal structures can also be patterned and formed through damascene techniques. A dielectric film is formed first. The dielectric is pattern etched to form inlays. Then, metal is deposited over the dielectric, filling the inlays and forming a film over the dielectric. A CMP process removes the overlying metal film, leaving the metal-filled inlays intact.

Commercial equipment is readily available to perform CMP processes. FIG. 1 illustrates an apparatus to perform a CMP process (prior art). CMP apparatus 10 includes a rotating table pad 12 and a rotating wafer mounting pad, or spindle 14. Typically, the wafer 16 to be polished is mounted, upside down, on a rotating spindle 14. Polishing pad 12 is also rotated. Polishing pad 12 is typically a commercially available polyester/polyurethane material. A slurry is introduced, through port 18, between rotating table pad 12 and wafer holder 14. The chief variables in the polishing process are the relative rotation rates of pad 12 and holder 14, the pressure between wafer 16 and pad 12, the time duration of the process, and the type of slurry used.

As the title implies, the CMP process removes materials from a wafer surface through both a chemical reaction and physical abrasion. In a typical CMP process the slurry contains a chemical agent which is an etchant, or modifier, selective to the material to be removed. The chemical agent acts to chemically dissolve the wafer surface, while the abrasive acts to remove the modified material from the wafer surface. When potassium hydroxide is used as the etchant and silica as the abrasive, such as slurry is effective for the polishing of silicon, silicon dioxide, and silicon nitride.

Several slurry compounds have been developed for the removal of Al, W, copper, Si, $SiO_2$, $Si_3N_4$, etc. However, no effective slurries are available for the removal of noble metals in a CMP process. The same qualities that make noble metal effective electrical conductors, make them resistant to chemical reaction and, therefore, difficult to etch. Even if deposition procedures are developed for noble metals, the lack of effective CMP procedures, especially effective slurries, prevent noble metal electrodes or interconnects to be used current IC designs.

It would be advantageous if a CMP process slurry were developed for the planarization of noble metals.

It would be advantageous if a slurry were developed that permitted noble metals to be planarized in standard CMP processes, using standard commercially available CMP equipment.

It would be advantageous if the advent of noble metal CMP processes permitted the formation of noble metal structures using damascene, or dual damascene deposition techniques.

Accordingly, a chemically active slurry to polish noble metals has been provided. The slurry comprises an elemental halogen in a strongly basic aqueous solution as the chemical agent, in addition to an abrasive. The elemental halogen may be either bromine, iodine, or chlorine, although bromine is preferred. The aqueous solution base may be either sodium hydroxide (NaOH), potassium hydroxide (KOH), tetramethyl ammonium hydroxide $((CH_3)_4NOH)$, or a generic tetraalkyl ammonium hydroxide $(R_4NOH)$, but NaOH is preferred. Specifically, 1.3 mols of bromine ($Br_2$) is combined with 0.5 mols of sodium hydroxide (NaOM), in 500 ml of pure water, to form a sodium hydroxide and bromine solution.

The abrasive may be either aluminum oxide ($Al_2O_3$), $CeO_2$, or $SiO_2$. When the abrasive is ($Al_2O_3$), it is mixed with water to form an aluminum oxide suspension including from 1 to 50% aluminum oxide by weight. Then, 5 parts, by volume, of sodium hydroxide and bromine solution are combined with 1 part of the aluminum oxide suspension.

A method of polishing, using a standard CMP process polishing table pad, is also provided. The method comprises the steps of:

a) placing a surface of noble metal in interaction with the polishing pad;

b) introducing a slurry, including an elemental halogen in a strongly basic aqueous solution and an abrasive, interposed between the table pad and the noble metal; and c) in response to Steps a) and b), chemically polishing the noble metal surface. In some aspects of the invention, Pt is removed from the surface at a rate of 1800 Å/min. A force of approximately 4 PSI between the metal surface and the table pad, and a polishing pad/spindle rotation rates of approximately 40 RPM is typical.

This CMP process is effective with the use noble metals selected from the group consisting of Pt, Ir, Ru, Pd, Ag, Au, Os, and Rh. It is expected that Pt CMP processes will be of the greatest commercial interest.

A damascene integrated circuit electrode for ferroelectric capacitor structures is also provided. The damascene electrode structure comprises a dielectric layer having a top surface along a horizontal plane and a vertical thickness extending from the dielectric top surface to a first horizontal level in the dielectric layer. The dielectric layer includes an inlay formed from the dielectric top surface, through the vertical thickness, to the dielectric first level. A noble metal electrode, with a roughness of approximately 15 nanometers (nm) and a top surface in alignment with the first plane, fills the dielectric inlay from the dielectric top surface to the dielectric first level. In this manner, the noble metal electrode through the dielectric layer. Dual damascene interconnect structures, with noble metal electrodes, are also provided.

DETAILED DESCRIPTION OF THE PREFERRED EMBODIMENT

Figure 1:
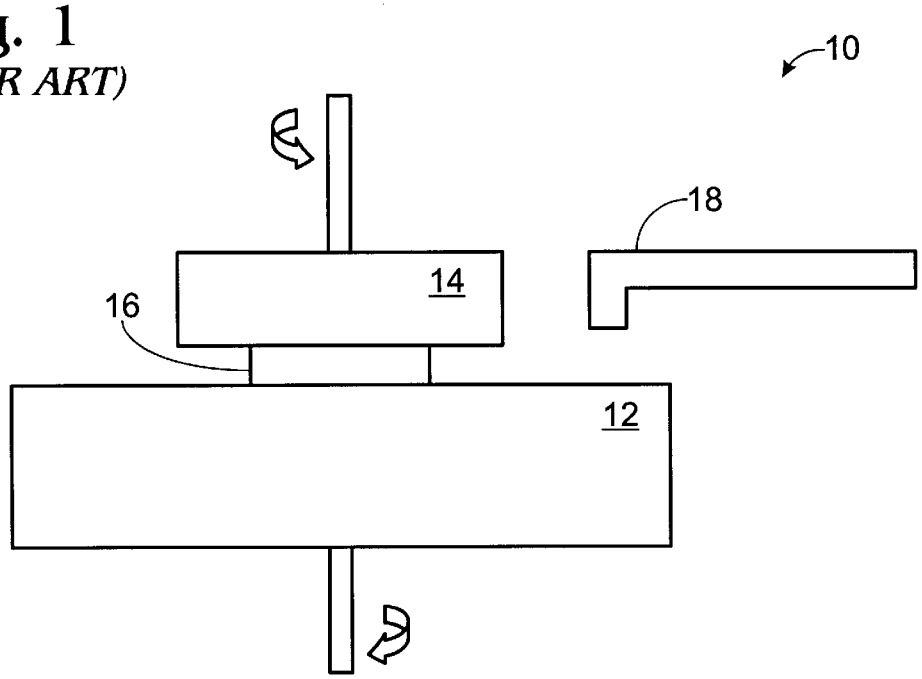
FIG. 1 illustrates an apparatus to perform a CMP process (prior art).

It is well-known that noble metals are difficult to polish. This is reflected in the reduction half-reaction potentials:

| | |
|---|---|
| $Ir^{3+} + 3e^- \rightarrow Ir$ | +1.156 v |
| $Pt^{2+} + 2e^- \rightarrow Pt$ | +1.118 v |

These potentials can be reduced by chloride, i.e., halide, ions:

| | |
|---|---|
| $IrCl_6^{3-} + 3e^- \rightarrow Ir + 6Cl^-$ | 0.770 v |
| $PtCl_4^{2-} + 2e^- \rightarrow Pt + 4Cl^-$ | +0.755 v |

Finally, reduction potentials are further reduced by increasing pH:

| | |
|---|---|
| $Ir_2O_3 + 3H_2O + 6e^- \rightarrow 2Ir + 6OH^-$ | +0.098 v |
| $Pt(OH)_2 + 2e^- \rightarrow Pt + 2OH^-$ | +0.140 v |

Therefore, a chemically active slurry to polish noble metals comprises an elemental halogen in a strongly basic aqueous solution and an abrasive. Typically, the strongly basic aqueous solution has a pH greater than approximately 10, however, a pH of approximately 11–13 is preferred. The resulting slurry is used to polish noble metals with conventional chemical mechanical polishing (CMP) equipment.

Oxidizers currently approved and on hand are iodine, bromine, iodate, periodate, perchlorate, peroxydisulfate, and permanganate. Of course, chlorine can be produced chemically by the reaction of nitric and hydrochloric acids.

It follows from the above analysis of the half-reaction potentials, that a solution of halogen in strong base would effective react with noble metals. An aqueous solution base is selected from the group consisting of sodium hydroxide (NaOH), potassium hydroxide (KOH), tetramethyl ammonium hydroxide (($CH_3)_4NOH$), and tetraalkyl ammonium hydroxide ($R_4NOH$).

In strong base, with the exception of fluorine, an elemental halogen disproportionates to form one equivalent of halide ion, $X^-$, and one equivalent of hypohalite ion, $XO^-$:

$$X_2 + 2OH^- \rightarrow X^- + XO^- + H_2O.$$

In the case of chlorine, the hypohalite, i.e., hypochlorite, ion relatively stable and no further disproportionation occurs at room temperature. However, for other halogens, further disproportionation can occur to form halite ion:

$$2XO^- \rightarrow X^- + XO_2^-$$

or halate ion:

$$3XO_2^- \rightarrow X^- + 2XO_3^-$$

or, finally even perhalate ion:

$$4XO_3^- \rightarrow X^- + 3XO_4^-.$$

In the case of chlorine, all oxohalogen ions exist (hypochlorite, chlorite, chlorate, and perchlorate); in the case of bromine and iodine only halate and perhalate ions are stable (hypobromite and hypoiodite are a transient species and bromite and iodite do not seem to exist).

The present invention comprises, therefore, an elemental halogen selected from the group consisting of bromine, iodine, and chlorine. In one preferred embodiment, the elemental halogen includes bromine in solution with sodium hydroxide.

Iodine is not effective due to insufficient oxidation potential. However, a combination of strongly basic bromine solution and alumina abrasive is effective, so that platinum can be polished at a rate of approximately 1500 Å/min.

The present invention slurry comprises an abrasive selected from the group consisting of aluminum oxide ($Al_2O_3$), $CeO_2$, and $SiO_2$. When the abrasive is aluminum oxide, aluminum oxide is mixed with water to form an aluminum oxide suspension including from 1 to 50% aluminum oxide by weight. 5 parts, by volume, of sodium hydroxide and bromine solution are combined with 1 part of aluminum oxide suspension.

Further, using the above-mentioned slurry, platinum patterning by the damascene method is achievable. In one aspect of the invention, plasma-enhanced chemical vapor deposition (PECVD) silicon dioxide is used for fabrication of the damascene structure. The damascene etch depth is 3100 Å. A 4500 Å layer of Pt is deposited on a thin TaN barrier layer previously deposited over the patterned surface. The slurry formulation used is:

Bromine: 105 g

Sodium Hydroxide 40 g

Specifically, 1.3 mols of bromine ($Br_2$) is combined with 0.5 mols of sodium hydroxide (NaOH) to form an aqueous solution of sodium hydroxide and bromine. The bromine can be measured in a tared beaker to which about 100 ml of DI water is added. Since bromine is heavier than, immiscible with, and only slightly soluble in water, it sinks to the bottom. Thus, the evolution of bromine vapor is less copious. In a separate beaker the sodium hydroxide is dissolved in about 200 ml of water. The heat of solution of NaOH is large and care must be taken since the hydroxide solution becomes very hot. Because the reaction between bromine and NaOH is highly exothermic, the sodium hydroxide solution is slowly added to the bromine and water mixture to prevent boiling and bromine vapor evolution. Once all of the sodium hydroxide is added, the bromine should be completely dissolved to form a clear orange solution. This mixture is diluted to a total volume of 500 ml and then 100 ml of Rodel MSW2000A (or some equivalent) alumina suspension is added to complete the slurry.

In alkaline solution, bromate and bromide ions are in equilibrium with elemental bromine according to the formula:

$$6Br_2 + 12OH^- \rightarrow 10Br^- + 2BrO_3^- + 6H_2O$$

Both bromine and bromate ions are relatively strong oxidizing agents and are responsible for attack of platinum.

Figure 2:
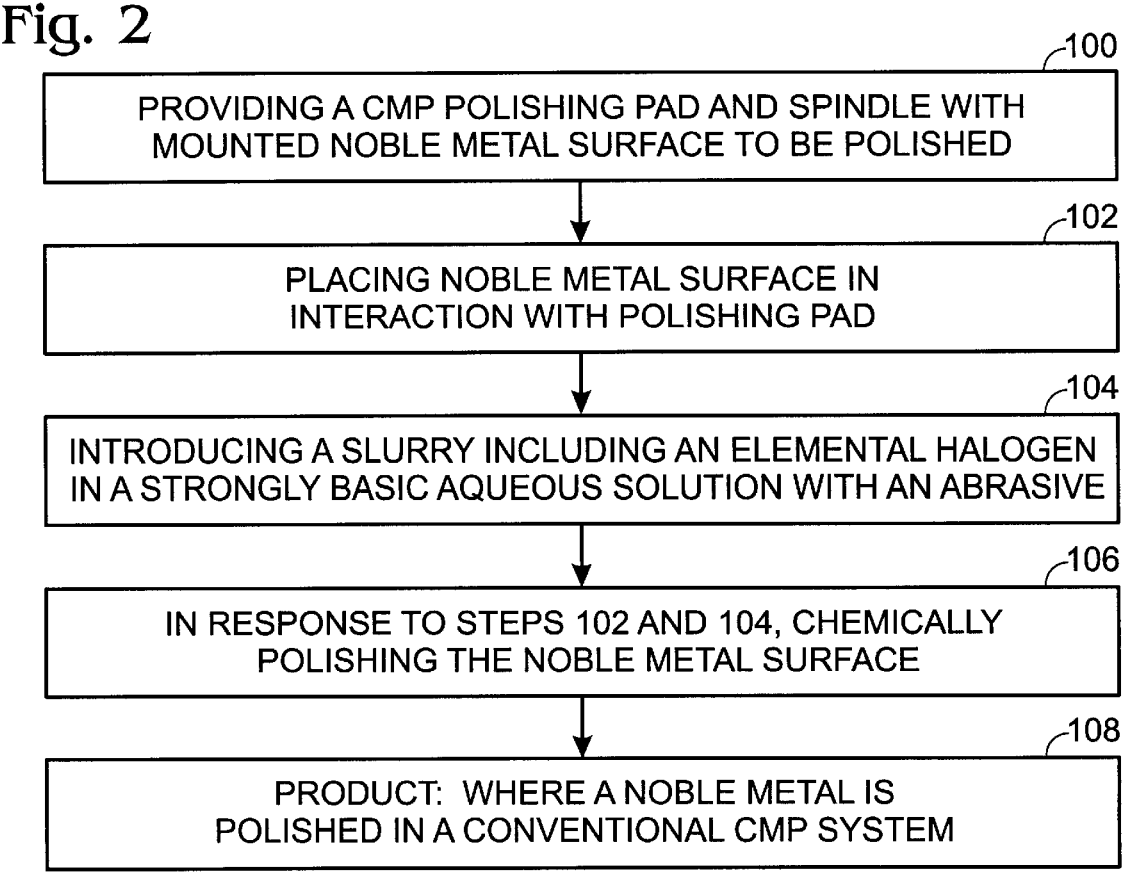
FIG. 2 is a flowchart illustrating steps in the present invention method of polishing a wafer with a noble metal surface.

FIG. 2 is a flowchart illustrating steps in the present invention method of polishing a wafer with a noble metal surface. Step 100 provides a CMP process table polishing pad and a spindle upon which an IC wafer is mounted. Step 102 places the wafer noble metal surface in interaction with the polishing pad. Step 102 includes a noble metal selected from the group consisting of Pt, Ir, Ru, Pd, Ag, Au, Os, and Rh, although Pt is preferred.

Step 104 introduces a slurry, including an elemental halogen in a strongly basic aqueous solution and an abrasive, interposed between the table pad and the noble metal surface. In some aspects of the invention, Step 104 includes an elemental halogen selected from the group consisting of bromine, iodine, and chlorine. The strongly aqueous basic solution of the slurry introduced in Step 104 includes a base selected from the group consisting of sodium hydroxide (NaOH), potassium hydroxide (KOH), tetramethyl ammonium hydroxide ($(CH_3)_4NOH$), and tetraalkyl ammonium hydroxide ($R_4NOH$). Preferably, the elemental halogen is bromine, then the slurry introduced in Step 104 includes bromine in solution with sodium hydroxide. Specifically, the slurry includes 1.3 mols of bromine ($Br_2$) combined with 0.5 mols of sodium hydroxide (NaOH).

The slurry introduced in Step 104 includes an abrasive selected from the group consisting of aluminum oxide ($Al_2O_3$), $CeO_2$, and $SiO_2$. When the abrasive is aluminum oxide, Step 104 includes aluminum oxide mixed with water to form an aluminum oxide suspension with from 1 to 50% aluminum oxide by weight. The slurry includes 5 parts, by volume, of the sodium hydroxide and bromine solution combined with 1 part of the aluminum oxide suspension. In some aspects of the invention, Step 104 includes introducing slurry at a flow rate in the range of approximately 0 to 300 milliliters per minute. In some aspects of the invention, the size of the particles in the slurry are approximately a micron, or less, in size.

Step 106, in response to Steps 102 and 104, chemically polishes the noble metal surface with a smooth surface finish. Step 102 includes a force in the range of approximately 0 to 6 pounds per square inch (PSI), with the preferred pressure being approximately 4 PSI, between the metal surface and the table pad. The polishing pad rotation rate is in the range of approximately 0 to 60 revolutions per minute (RPM), with a preferred rotation rate of approximately 40 RPM. Likewise, the spindle rate is in the range of approximately 0 to 60 revolutions per minute (RPM), with a preferred rotation rate of approximately 40 RPM. Step 108 is a product, where the noble metal is polished in a conventional chemical-mechanical polishing (CMP) system.

In some aspects of the invention, Step 102 includes Pt being the noble metal, then Step 106 includes removing material from the Pt surface at a rate in the range of approximately 1500 to 2000 Å/min, with a preferred removal rate of approximately 1800 Å/min.

In some aspects of the invention, Step 106 includes polishing the noble metal to a roughness of less than 50 nanometers (nm). The preferred roughness is approximately 15 nm. Step 106 also includes a removal of 0.5 microns of noble metal material, as measured from an equivalent flat noble metal surface.

In general, the polish rate of platinum metal over a TaN barrier layer in the above-mentioned slurry is about 1800 Å/min at a down force of 4 PSI and a rotation speed of 40 rpm for both the spindle and table. In contrast, TaN was removed only around the periphery of features due to erosion. The surface finish of the platinum was very smooth and defect free. The remaining TaN may be removed either in dilute HF solution or by plasma etching.

Figure 3:
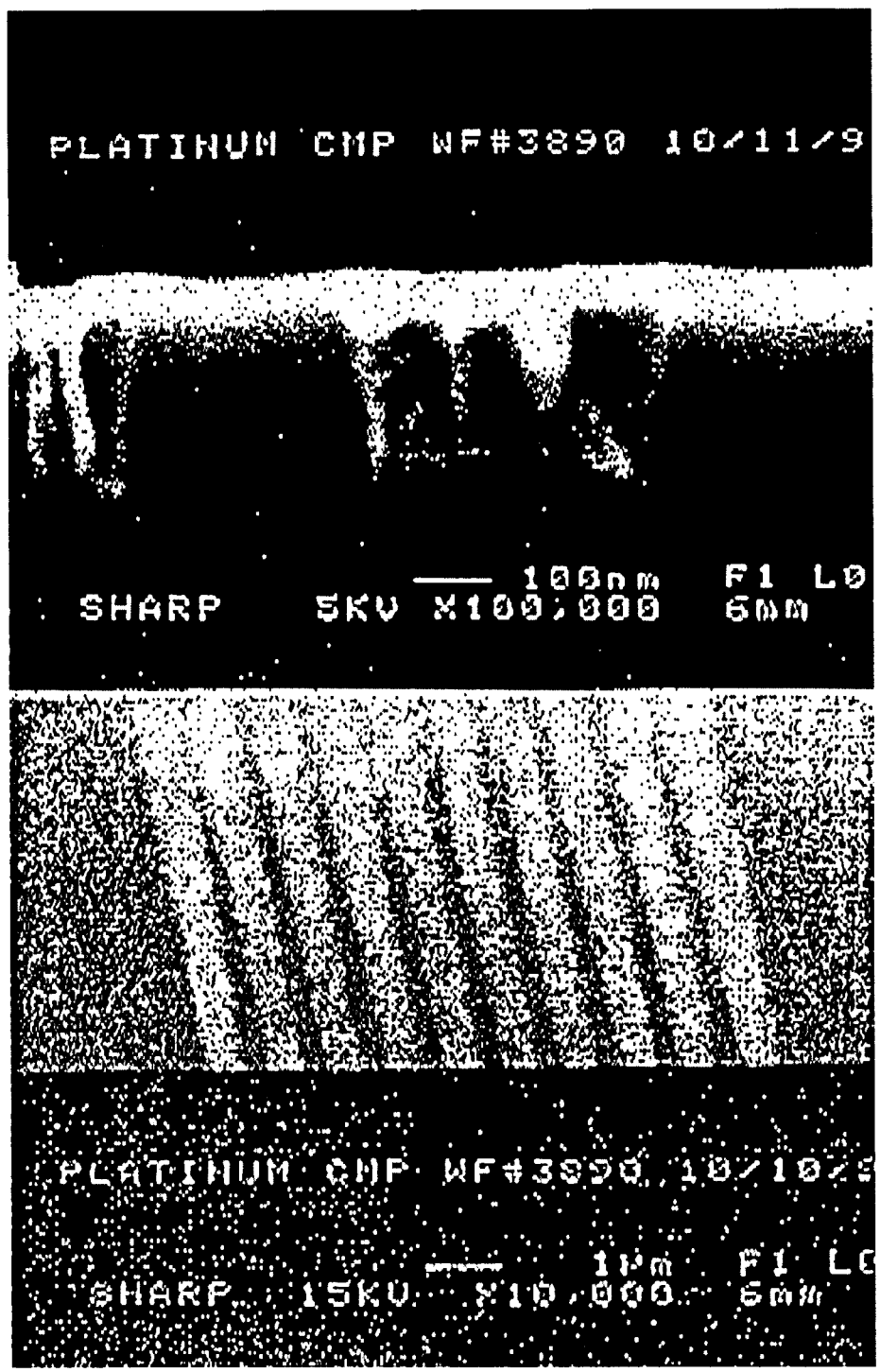
FIG. 3 illustrates SEM's of damascene Pt.

FIG. 3 illustrates SEM's of damascene Pt. These pictures show cross-sections of narrow Pt lines formed from filling an inlay with Pt and polishing. Damascene platinum structures can be fabricated with the above-mentioned bromine/hydroxide platinum polishing slurry, using TiN and TiN/Ti barrier layers, instead of TaN. Unlike the case of TaN, the platinum slurry easily removes the barrier layers from the field region. The platinum polish rate remains repeatable at about 1500 Å/min. The polished field appears reasonably clean and undamaged.

Figure 4:
FIG. 4 illustrates an optical micrograph of damascene Pt using the present invention slurry.

FIG. 4 illustrates an optical micrograph of damascene Pt using the present invention slurry. FIG. 4 demonstrates the dynamics involved in performing a CMP process on an IC structure having an inlay or damascene structure which is to be filled with metal to form an electrical interconnection. It is understood that a damascene structure includes a single inlay, such as a via or interconnection trench. A damascene structure also includes a dual damascene structure which may be an interconnection trench overlying, and in register with, a via to from an interconnection through both inlay structures.

Figure 5:
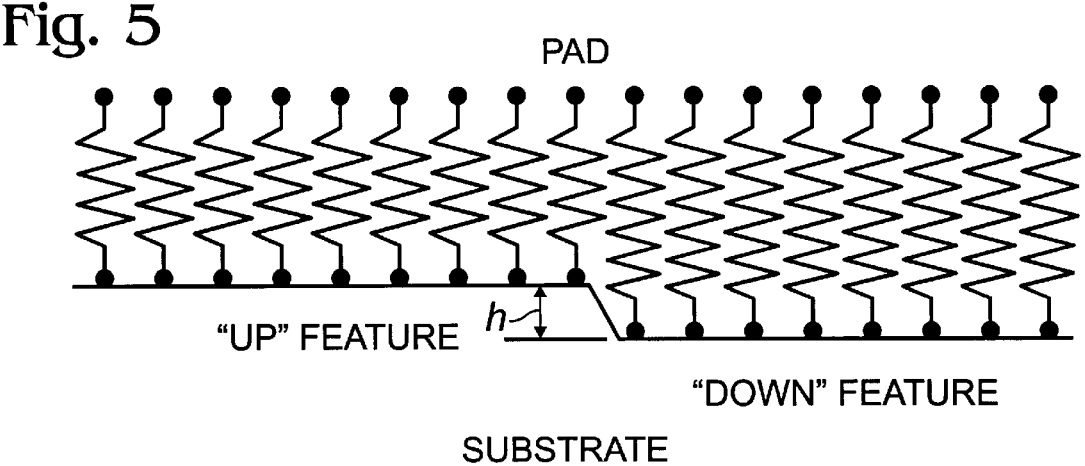
FIG. 5 is an illustration of the effect of topography

Planarization of topography is determined by the rate at which nearby features of differing heights and/or densities are planarized by the polishing process. For example, a dielectric top surface and a first level in the dielectric layer. The differing heights may be the result of an inlay, such as a via, in the dielectric layer. FIG. 5 is a schematic illustration of the effect of topography. Here, the polishing pad is represented as an array of "springs" which are more or less compressed by contact with the substrate. At this point, it is necessary to stress that the physical nature of these springs should not simply be identified with the bulk elastic properties of the polishing pad material. Such an identification could only be applicable in the case that the pad surface is intrinsically very smooth and uniform. However, it is well known that polishing pads used for CMP are anything but smooth and uniform, and are in fact rather rough and covered with a large number of randomly distributed asperities. Indeed, in order to maintain a useful removal rate it is usual to roughen the pad, i.e., create new asperities, intentionally during the polishing process. Thus, it is more realistic to identify the springs in the above figure with individual pad asperities, which may have elastic characteristics quite different from those of the bulk material.

Figure 6:
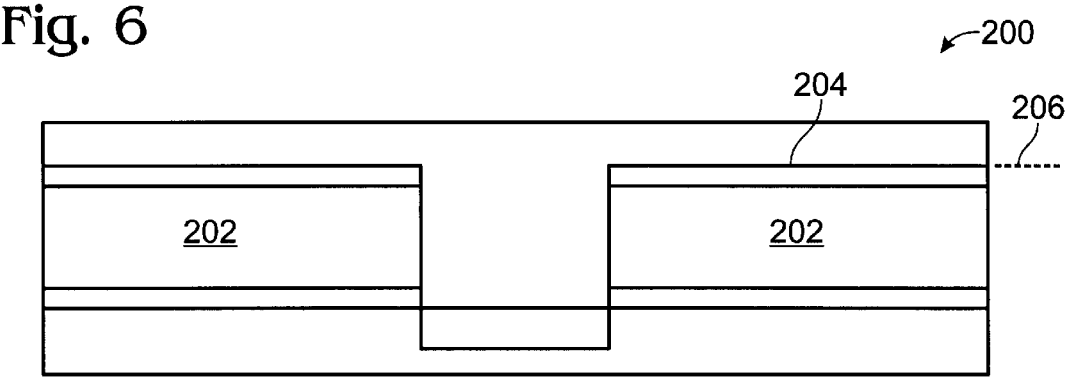
FIG. 6 illustrates preliminary formation of a damascene integrated circuit electrode for a ferroelectric capacitor structure.

FIG. 6 illustrates preliminary formation of a damascene integrated circuit electrode for a ferroelectric capacitor structure 200. Interconnect structure 200 comprises a dielectric layer 202 having a top surface 204 along a first horizontal plane 206. A noble metal is deposited to form a metal film having a noble metal surface.

Figure 7:
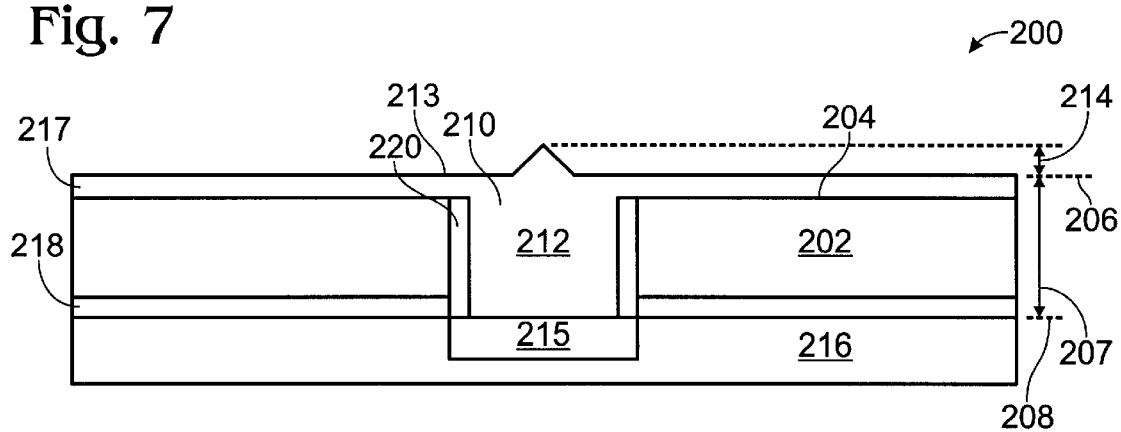
FIG. 7 illustrates the electrode structure of FIG. 6 after a CMP process.

FIG. 7 illustrates electrode structure 200 of FIG. 6 after a CMP process. Dielectric layer 202 also includes a first vertical thickness, represented by reference designator 207, extending from dielectric top surface 204 to a first horizontal level 208 in dielectric layer 202.

Dielectric layer 202 includes a first inlay 210 formed from dielectric top surface 204 through first thickness 207 to dielectric first horizontal level 208. Typically, first inlay 210 is a via or an interconnection trench. A noble metal electrode 212, having a top surface 213, with a roughness (represented by reference designator 214) in the range of approximately 0 to 50 nm, in alignment with first plane 206, fills dielectric first inlay 210 from dielectric top surface 204 to dielectric first horizontal level 208. The noble metals used for electrode 212 are selected from the group consisting of Pt, Ir, Ru, Pd, Ag, Au, Os, and Rh. Noble metal electrode 212 forms an interconnection through dielectric layer 202. In some aspects of the invention, electrode 212 serves as an interconnection stud, through dielectric interlevel 202, between metal levels.

Typically, interconnection structure 200 further includes a conductive connection surface 215 on a substrate 216. Conductive connection surface is selected from the group of materials consisting of interconnect metal, polysilicon, and semi active areas such as a transistor electrode. Dielectric layer 202 overlies conductive connection surface 215. Noble metal electrode 212 extends through dielectric layer 202 from dielectric top surface 204 to conductive connection surface 215. In this manner, noble metal ferroelectric capacitor electrode 200 is formed from conductive connection surface 214 to dielectric top surface 204.

In some aspects of the invention, barrier layer 217 overlies dielectric layer 202, and dielectric layer overlies a barrier layer 218. Typically, these barrier layers are non-conductive, but conductive barriers layers are also used in other aspects of the invention. In some aspects of the invention, barrier layer 220 lines first inlay 210. Barrier layer 220 is either conductive or non-conductive. In some aspects, not shown, a conductive barrier material is interposed between electrode 212 and conductive connection surface 215.

Figure 8:
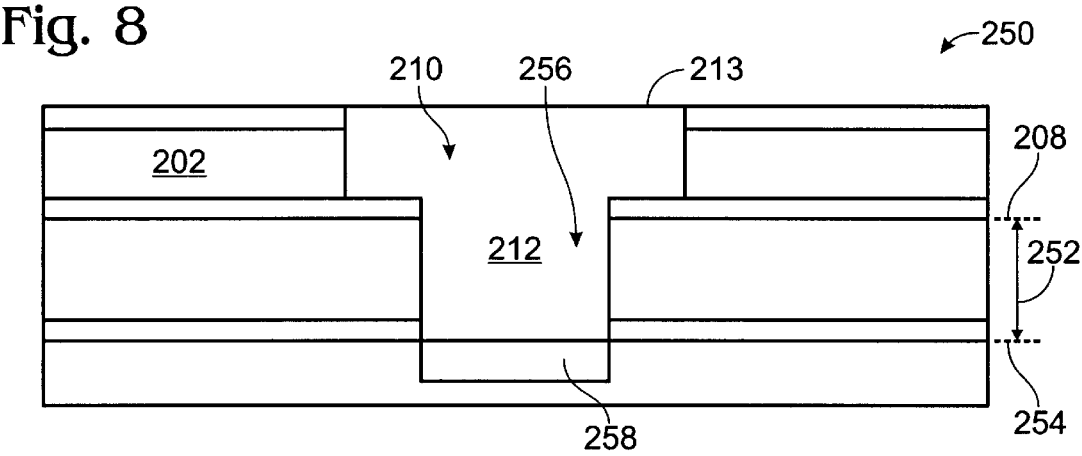
FIG. 8 illustrates a dual damascene noble ferroelectric capacitor electrode structure, similar to the electrode structure of FIG. 7.

FIG. 8 illustrates a dual damascene noble ferroelectric capacitor electrode structure 250, similar to electrode structure 200 of FIG. 7. In the interests of brevity some common elements of the damascene electrode structure 200 of FIG. 7 are repeated in FIG. 8 Dielectric layer 202 has a second vertical thickness, represented by reference designator 252, extending from dielectric first horizontal level 208 to a second horizontal level 254 in dielectric layer 202. Alternately, second thickness 252 is a separate dielectric layer upon which dielectric layer 202 lies. In some aspects of the invention, a barrier layer does not separates the two dielectric layers.

A second inlay 256 is formed in dielectric layer 202 from dielectric first horizontal level 208 to dielectric second horizontal level 254. Second inlay 256 is, at least partially, in register with first inlay 210. Noble metal electrode 212 fills first 210 and second dielectric inlays 256 from dielectric top surface 204 to dielectric second horizontal level 254. In some aspects of the invention, first inlay 210 is an interconnection trench and second inlay 256 is a via. In this manner, dual damascene electrode structure 250 is formed. Typically, electrode structure 250 interfaces between a conductive surface 258, under electrode 212 and dielectric layer 202, to dielectric top surface 204.

A slurry and CMP process to polish a noble metal surface is provided herein. Using the above-mentioned slurry and polishing process, a damascene, or dual damascene noble metal inlay may be formed. The slurry is novel in the use of a halogen, such as bromine, in a basic aqueous solution to chemically react with the noble metal during a CMP process. Other variations and embodiments of the present invention will occur to those skilled in the art.

What is claimed is:

1. A chemically active slurry to polish noble metals comprising:

an elemental halogen in a strongly basic aqueous solution, said elemental halogen being selected from the group consisting of bromine, iodine, and chlorine; and an abrasive, whereby the resulting slurry is used to polish noble metals with conventional chemical mechanical polishing (CMP) equipment.

2. A slurry as in claim 1 in which said strongly basic aqueous solution has a pH greater than 10.

3. A slurry as in claim 1 in which said strongly basic aqueous solution is selected from the group consisting of sodium hydroxide, potassium hydroxide, tetramethyl ammonium hydroxide, and tetralkyl ammonium hydroxide.

4. A chemically active slurry to polish noble metals comprising:

an elemental halogen in a strongly basic aqueous solution, including bromine in solution with sodium hydroxides; and an abrasive, whereby the resulting slurry is used to polish noble metals with conventional chemical mechanical polishing (CMP) equipment.

5. A slurry as in claim 1 in which said abrasive is selected from the group consisting of aluminum oxide, $CeO_2$, and $SiO_2$.

6. A chemically active slurry to polish noble metals comprising:

an elemental halogen in a strongly basic aqueous solution; and an abrasive, said abrasive being aluminum oxide mixed with water to form an aluminum oxide suspension including from 1 to 50% aluminum oxide by weight, whereby the resulting slurry is used to polish noble metals with conventional chemical mechanical polishing (CMP) equipment.

7. A slurry as in claim 6 in which 1.3 mols of bromine is combined with 0.5 mols of sodium hydroxide, in 500 ml of water, to form an aqueous solution of sodium hydroxide and bromine.

8. A slurry as in claim 7 in which 5 parts, by volume, of said sodium hydroxide and bromine solution are combined with 1 part of said aluminum oxide suspension.

* * * * *